United States Patent
Fonkenell

(10) Patent No.: US 9,611,607 B2
(45) Date of Patent: Apr. 4, 2017

(54) HYDRO-ELECTRIC POWER PLANT COMPRISING A GRATING ASSEMBLY FOR TAKING WATER INTO THE TURBINE, WHICH IS DESIGNED TO DISCHARGE FLOATING DEBRIS STOPPED BY THE GRATING

(75) Inventor: Jacques Fonkenell, Millau (FR)

(73) Assignee: MJ2 TECHNOLOGIES, La Cavalerie (FR)

( * ) Notice: Subject to any disclaimer, the term of this patent is extended or adjusted under 35 U.S.C. 154(b) by 386 days.

(21) Appl. No.: 14/117,971

(22) PCT Filed: Apr. 11, 2012

(86) PCT No.: PCT/FR2012/050788
§ 371 (c)(1),
(2), (4) Date: Jan. 3, 2014

(87) PCT Pub. No.: WO2012/156604
PCT Pub. Date: Nov. 22, 2012

(65) Prior Publication Data
US 2014/0102989 A1   Apr. 17, 2014

(30) Foreign Application Priority Data
May 17, 2011   (FR) ...................... 11 54257

(51) Int. Cl.
*B01D 29/96* (2006.01)
*B01D 35/02* (2006.01)
(Continued)

(52) U.S. Cl.
CPC ............ *E02B 5/085* (2013.01); *B01D 29/965* (2013.01); *B01D 35/02* (2013.01); *E02B 8/023* (2013.01);
(Continued)

(58) Field of Classification Search
CPC ............ B01D 29/0013; B01D 29/0077; B01D 29/0097; B01D 29/014; B01D 29/445;
(Continued)

(56) References Cited

U.S. PATENT DOCUMENTS 1,411,945 A * 4/1922 Wallene ............... B01D 33/333
210/122
1,586,754 A * 6/1926 Leonard .................. E02B 8/023
210/154
(Continued)

FOREIGN PATENT DOCUMENTS

FR   2 531 118 A1   2/1984
FR   2 835 548 A    8/2003
(Continued)

OTHER PUBLICATIONS

International Search Report, dated Aug. 29, 2012, from corresponding PCT application.

*Primary Examiner* — Joseph Drodge
(74) *Attorney, Agent, or Firm* — Young & Thompson

(57) ABSTRACT

A power plant which operationally combines a downstream turbine unit (7) and an upstream grating assembly (8), includes a grating (16), a supporting structure (17), and an element (18) for associating the grating (16), which has a structure that enables movement of at least the upper portion of the grating (16) between an upright position for the debris-stopping function and a folded-down position for discharging the floating debris stopped by the grating (16).

22 Claims, 4 Drawing Sheets

Figure 1:
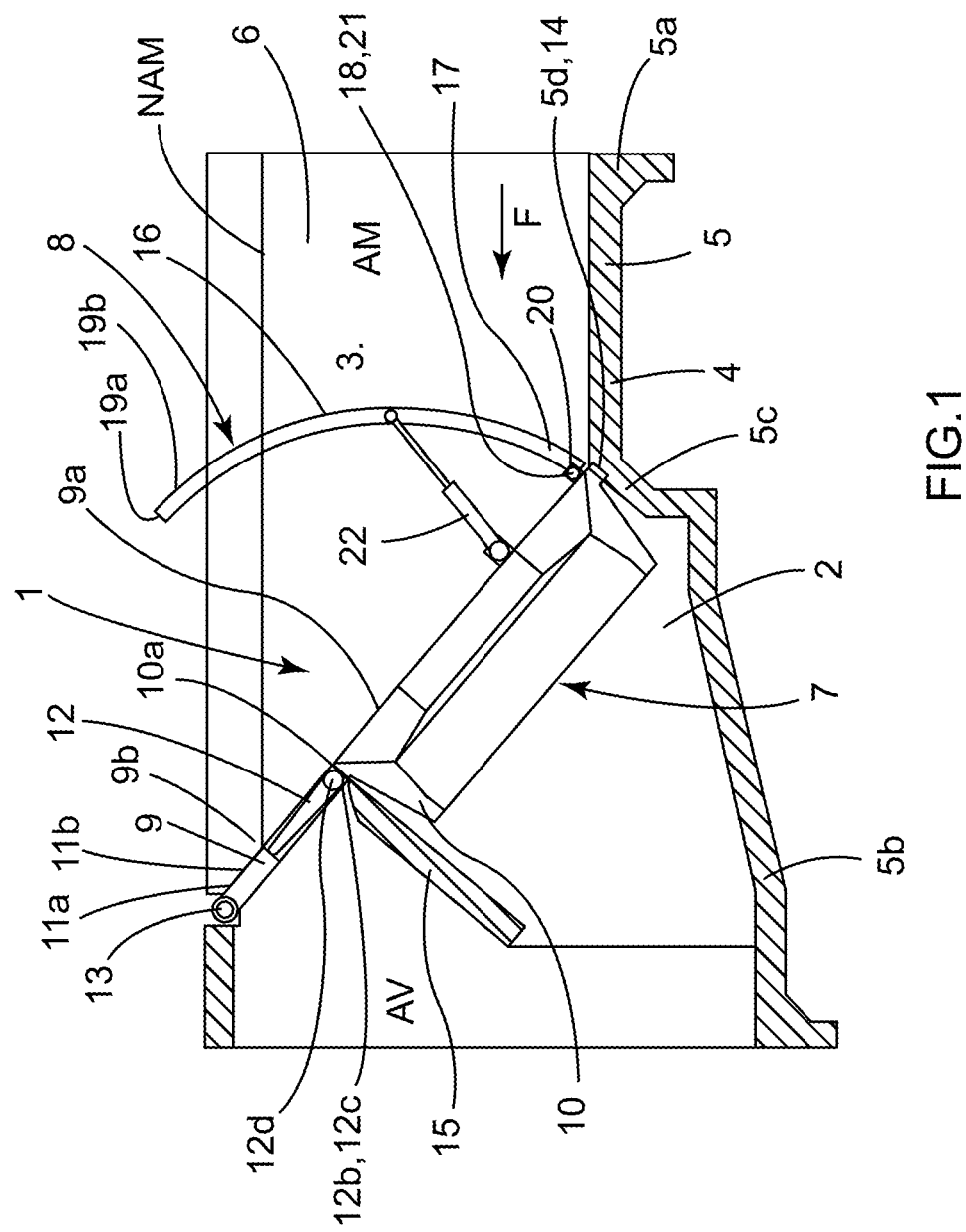

(51) Int. Cl.
    *E02B 3/02*          (2006.01)
    *E02B 5/08*          (2006.01)
    *F03B 11/08*         (2006.01)
    *F03B 13/08*         (2006.01)
    *F03B 15/00*         (2006.01)
    *E02B 8/02*          (2006.01)
    *F03B 3/04*          (2006.01)
    *F03B 3/14*          (2006.01)
    *E02B 9/04*          (2006.01)

(52) U.S. Cl.
    CPC .................. *F03B 3/04* (2013.01); *F03B 3/14* (2013.01); *F03B 11/08* (2013.01); *F03B 13/08* (2013.01); *E02B 9/04* (2013.01); *Y02E 10/22* (2013.01); *Y02E 10/223* (2013.01); *Y02E 10/226* (2013.01)

(58) Field of Classification Search
    CPC ...... B01D 29/62; B01D 29/70; B01D 29/965; B01D 35/02; B01D 35/16; B01D 37/00; B01D 37/04; B01D 2201/04; B01D 2201/0415; B01D 2201/28; B01D 2201/285; B01D 2201/31; B01D 2221/12; B01D 29/96; E02B 3/02; E02B 3/023; E02B 5/08; E02B 5/082; E02B 5/085; E02B 8/023; E02B 9/04; F03B 3/04; F03B 3/14; F03B 11/08; F03B 15/00; F03B 15/02; F03B 15/04; F03B 15/06; F03B 13/08; Y02E 10/22; Y02E 10/223; Y02E 10/226
    USPC ......... 210/97, 154–162, 359, 407, 483, 498, 210/499, 741, 767; 60/204, 325, 368, 60/453, 454, 459, 463, 545, 398; 405/75, 405/80, 99; 415/13, 17, 24, 121.2, 121.3, 415/905–908; 416/1, 31, 244, 244 R, 416/244 A, 246, 244 B, 247, 247 R, 416/247 A; 290/43, 54

See application file for complete search history.

(56) References Cited

U.S. PATENT DOCUMENTS

| | | | | |
|---|---|---|---|---|
| 1,606,546 | A * | 11/1926 | Wallene | B01D 33/0058 210/160 |
| 4,319,142 | A * | 3/1982 | Mayo, Jr. | E02B 9/00 290/52 |
| 4,415,462 | A * | 11/1983 | Finch | B01D 33/0016 210/162 |
| 6,281,597 | B1 * | 8/2001 | Obermeyer | F03B 13/08 290/43 |
| 6,409,915 | B1 * | 6/2002 | Rusch | B01D 29/44 210/159 |
| 6,533,536 | B1 * | 3/2003 | Fisher, Jr. | F03B 3/06 415/13 |
| 2004/0066043 | A1 * | 4/2004 | Maiwald | F03B 3/06 290/43 |
| 2004/0222641 | A1 * | 11/2004 | Panholzer | F03B 13/08 290/43 |
| 2006/0037897 | A1 * | 2/2006 | Jackson | B01D 33/333 210/158 |
| 2007/0286715 | A1 | 12/2007 | Fonkenell | |
| 2009/0026767 | A1 * | 1/2009 | Petrounevitch | F03B 13/264 290/53 |
| 2010/0327586 | A1 * | 12/2010 | Mardirossian | F03B 13/00 290/50 |
| 2012/0187692 | A1 * | 7/2012 | Walton | F03B 13/08 290/54 |
| 2013/0140825 | A1 | 6/2013 | Holstein et al. | |

FOREIGN PATENT DOCUMENTS

FR         2 862 723 A1     5/2005
WO    2011/134585 A1   11/2011

\* cited by examiner

HYDRO-ELECTRIC POWER PLANT COMPRISING A GRATING ASSEMBLY FOR TAKING WATER INTO THE TURBINE, WHICH IS DESIGNED TO DISCHARGE FLOATING DEBRIS STOPPED BY THE GRATING

BACKGROUND OF THE INVENTION

Field of the Invention

The invention relates to the protection of turbines of hydro-electric power plants installed on civil waterworks, from the debris carried by the water, as such debris is likely to deteriorate or affect performance if it passes through the blades wheels of the turbines. The invention relates more specifically to the removal of the floating debris stopped by the grating of grating assemblies equipping such hydro-electric power plants, without such debris passing through the impellers of the turbine units.

The invention relates to the case of a hydro-electric power plant of known type, comprising a turbine unit, including:

a supporting structure in or parallel to the main plane of the assembly, comprising a closed main portion in which is located a cylindrical housing with upstream and downstream openings, and an upper portion with an opening, and a turbine with impeller, in particular with blades which may be more or less tilted, mounted in the housing, which may have an immersed downward position where the unit is tilted from upstream to downstream and from the bottom toward the top.

A first object of the invention concerns a hydro-electric power plant for civil waterworks that includes a channel for flowing water limited by a structure having a bottom slab and two walls forming side walls, said plant comprising, operatively associated, a downstream turbine unit as just defined, and an upstream grating assembly which allows the inflow of water.

A second object of the invention relates to a grating assembly intended to be operatively associated with a turbine unit in order to form such a hydro-electric power plant.

A third object of the invention relates to a method for implementing such a hydro-electric power plant, for the purposes of discharging the floating debris stopped by the grating.

Description of the Related Art

Document FR-A-2862723 discloses a turbine unit for a hydro-electric power plant of the type which is the object of the invention. Such a hydro-electric power plant is intended for equipping a watercourse where there is a very low drop of less than 10 meters, and preferably from 1 to 5 meters. It comprises an impeller, the ratio between the kinetic energy of the flow of water exiting the impeller and the potential energy of the drop being less than 20%. The turbine unit is equipped, on the upstream side and opposite the opening of the impeller housing, with a water intake grating that is adapted and intended to stop, on its upstream side, any debris carried by the water of a size that is greater than the size of the openings through the grating. In addition, the turbine unit is equipped, on the upstream side where the grating in question is located, with a scraper with rotating arms associated with the grating and having the function of scraping off the debris that accumulates on the upstream side of the grating.

In embodiments of this type, there is often also a water intake pre-grating adapted and intended for mounting in an upright position in and across the channel of the civil waterworks, upstream of the turbine unit. This pre-grating has openings that are larger than the openings through the grating equipping the turbine unit. Thus, the pre-grating is adapted and intended to stop the larger debris carried by the stream of water, while the grating equipping the turbine unit is adapted and intended to stop the smaller debris. The pre-grating and grating therefore combine their effects. Such a pre-grating is part of a grating assembly allowing the inflow of water which, in addition to the pre-grating, further includes means for associating the pre-grating with the supporting structure of the turbine unit, or more frequently with the structure of the civil waterworks.

Document FR-A-2531118 describes such a pre-grating which is fixed and tilted, which casts doubt on its effectiveness.

With such embodiments, it is necessary to have the pre-grating cleaned manually on a preventive or regular basis or when the amount of clogging reaches a certain maximum level. Arrangements are sometimes made such as appropriate orientation of the pre-grating to facilitate the removal of the floating debris, or a descending shield to facilitate the sliding of the debris on the surface of the pre-grating, or a pre-grating set further forward to facilitate removal of the debris from above.

However, these arrangements are not always possible or easy to implement. Moreover, the automated cleaning systems required are expensive, bulky, and poorly suited for integration in a discreet or aesthetic manner.

Document FR-A-2835548 discloses a linear hinged module for unclogging the grating, comprising a scraper supported at the end of a movable arm, which makes this device unsuitable as has been previously indicated.

Thus, for a hydro-electric power plant comprising, operatively associated, a downstream turbine unit and an upstream grating assembly for allowing the inflow of water, there is a need to remove the floating debris stopped by the grating of the grating assembly to prevent the debris from passing through the impeller, in an effective, easy manner that is as inexpensive as possible, by means of an arrangement that is as simple, robust, and compact as possible.

The invention provides a solution to this problem.

U.S. Pat. No. 1,586,754 relates to a double rack for a water supply, with a pre-grating or front rack for stopping debris. The retaining grating or bottom rack is then inactive. When the double rack arrangement is in the upper position, the pre-grating or front rack is substantially horizontal and a valve is open, so that the debris that was on the pre-grating are sent into a tank and a passage connecting to a space. The water then passes through the retaining grating or bottom rack which retains the debris. After the pre-grating has been lifted, the door is opened and the water passes over the pre-grating into the channel or passage and, simultaneously, washes the debris from the pre-grating so it passes into the channel or passage around the turbine and travels downstream. Then the door is open or closed as desired.

As one can see, an embodiment according to U.S. Pat. No. 1,586,754 relates to a very specific hydro-electric power plant in which the turbine unit is of a very specific type and is in a very specific arrangement which have nothing to do with the type and arrangement of a turbine unit as described in document FR-A-2862723, the latter type and arrangement being the object of the invention.

SUMMARY OF THE INVENTION

For the purpose of solving the problem mentioned above, in a first aspect the invention relates to a hydro-electric power plant for a civil waterworks which includes a channel and a structure with a bottom slab and side walls, comprising, operatively associated:
- a downstream turbine unit, including:
  - a supporting structure in or parallel to the main plane of the assembly, comprising a closed main portion in which is located a cylindrical housing with upstream and downstream openings, and an upper portion with an opening,
  - and a turbine with impeller, in particular with blades which can be tilted to a greater or lesser extent, mounted in the housing, which can be in an immersed downward position where the unit is tilted from upstream to downstream and from the bottom toward the top,
- an upstream grating assembly for allowing the inflow of water, adapted and intended to be installed in and across the channel, including:
  - a grating supported by a supporting structure and which, fulfilling a debris-stopping function, is adapted and intended to stop, on its upstream side, any debris carried by the water that is larger than the openings through the grating,
  - and means for associating the grating with the structure, adapted and intended for placing the grating in and across the channel in an upright position in order to perform its debris-stopping function so that water free of debris travels through the impeller.

This hydro-electric power plant is such that:
- the association means have a structure that allows the movement of at least the upper portion of the grating such that it is adapted and intended for placement in one or the other of the upright position and a folded-down position in which its upper portion is located above, and in particular at least slightly downstream of, the upper portion of the edge of the housing, in order to discharge, in the downstream direction and above its upper edge, the floating debris stopped by the grating, without the debris passing through the impeller,
- the grating assembly comprises grating movement and retention means which, in response to a control or to control means, are adapted and intended to move the grating from one to the other of its two positions and to retain it in one or the other of its two positions.

In two possible embodiments, the grating assembly and the turbine unit are either: arranged near one another, in particular adjacent to one another, and structurally associated with each other to form a structural unit, the grating association means then being associated with the supporting structure of the turbine unit; or structurally dissociated from one another, the grating association means then being associated with the structure of the civil waterworks or with the supporting structure of the turbine unit.

In one embodiment, the lower transverse edge of the grating assembly and the lower transverse edge of the turbine unit are close to each other, in particular are adjacent, and in particular are close to, or adjacent to, the bottom slab.

In one embodiment, the grating association means have a structure, in particular of the type comprising a shaft mounted in a bearing, suitable to allow at least the upper portion of the grating to pivot about a transverse axis.

In one embodiment, the grating forms a solid unit, moved as a unit and placed as a unit in either one of the two positions, upright or folded down. The grating association means have a structure allowing the grating to pivot about a transverse axis arranged close to or adjacent to the bottom slab, in particular following an angular path between the upright position and folded-down position of about 35° to 55°.

In a typical embodiment, the grating is pivotably associated with the turbine unit so that it pivots about a transverse axis arranged close to or adjacent to the lower transverse edge of the grating assembly and the lower transverse edge of the turbine unit. The grating association means are associated with the supporting structure of the turbine unit.

In one embodiment, the grating movement and retention means are selected from among an assortment comprising linear displacement means such as a jack, or rotary displacement means such as a rotary engine, or manual means.

In one embodiment, the grating comprises bars, in particular bars regularly spaced apart, in general extending parallel to one another in a direction that can be raised.

In one embodiment, the grating is curved with its convexity facing upstream and away from the turbine unit and its concavity facing downstream and towards the turbine unit, so that when in the folded-down position, the upper portion of the grating is adapted and intended to be horizontal or slightly inclined to the horizontal.

In one embodiment, and in one arrangement, the hydro-electric power plant comprises:
- a flap valve of a flap valve assembly having a valve opening, which:
  - is located adjacent to and above the upper portion of the edge of the impeller housing, and in the downstream direction with the upper transverse edge of the grating in the folded-down position, said upper transverse edge being level with the valve opening,
  - is adapted and intended for placement in and across the channel,
  - is adapted and intended for placement in either of two positions, an upright closure position for stopping with the blade the facing incoming flow of water, and a folded-down opening position for allowing said flow of water to pass without passing through the impeller,
- means for associating the flap valve with the supporting structure of the turbine unit and/or with the supporting structure of the grating and/or with the structure of the civil waterworks, having a structure which allows the movement of the flap valve so that it is adapted and intended to be arranged in one of its two positions, upright closure and folded down opening,
- flap valve movement and retention means which, in response to a control or to control means, are adapted and intended to move the flap valve between one and the other of its two positions and to retain it in one or the other of its two positions,
- and controller means for the grating movement and retention means and for the flap valve movement and retention means or for their controls or control means, such that:
  - when the grating is in the upright position, the flap valve performs a closing function, being adapted and intended to be in the upright closure position such that the flow of water having previously passed through the grating assembly and free of the debris stopped by said grating assembly passes through the impeller without being able to pass through the valve opening,
  - and when the grating is in the folded-down position, the upper transverse edge of the grating is level with the valve opening, which acts to send, downstream of the flap valve and through the valve opening, the floating debris stopped by the grating, without the discharged debris passing through the impeller.

In one embodiment, the flap valve assembly and the turbine unit are structurally associated with each other, the flap valve association means being associated with the supporting structure of the turbine unit.

In one embodiment, the flap valve association means have a structure, particularly of the type comprising a shaft mounted in a bearing, adapted to allow the flap valve to pivot about an axis arranged transversely, in particular toward the lower transverse edge of the flap valve, toward the upper edge of the impeller housing, and near the upper transverse edge of the grating in the folded-down position, in particular following an angular path between the upright closure position and the folded-down opening position of about 50° to 90°.

In one embodiment, the flap valve movement and retention means are selected from among an assortment comprising linear displacement means such as a jack, or rotary displacement means such as a rotary engine, or manual means.

In one embodiment, the hydro-electric power plant further comprises means for detecting the degree of clogging of the grating, said means being associated with the controller means for the grating movement and retention means, the flap valve movement and retention means, or their control means.

In one embodiment, the main plane of the turbine unit, the plane of the flap valve in its upright closure position, and the plane defined by the upper and lower transverse edges of the grating assembly, lie in one or more planes, in particular adjacent planes, inclined from upstream to downstream and from the bottom toward the top at an angle of between 35° to 60°.

In one embodiment, the hydro-electric power plant further comprises a deflecting and partitioning wall extending downstream from the turbine unit and flap valve assembly, arranged between the upper portion of the edge of the impeller housing and the lower transverse edge of the valve opening so as to separate the streams of water respectively passing through them, said deflecting and partitioning wall being inclined from upstream to downstream and from the top downwards.

In one embodiment, the turbine unit is equipped, on the upstream side and opposite the opening of the impeller housing, with a water intake grating that is adapted and intended to stop, on its upstream side, any debris carried by the water of a size greater than the openings through said grating, these openings being smaller in size than the openings through the grating of the grating assembly, said grating then constituting a pre-grating assembly.

In one particular embodiment, the turbine unit is equipped on its upstream side with a scraper, particularly a rotating scraper, associated with the intake grating of the turbine unit, and the control means for the scraper movement means are associated with the controller means for the grating movement and retention means, or the flap valve movement and retention means, or their control means.

In one typical embodiment, the impeller and the housing of the turbine unit are arranged so as to be adapted and intended for placement in one of two positions, an immersed downward position for an electricity generation function, and a non-immersed raised position for access to the turbine unit and/or for clearing the water flow channel. Thus, the grating of the grating assembly is moved with the housing of the turbine unit.

A second aspect of the invention relates to a grating assembly adapted to be operatively associated with a turbine unit in order to form a hydro-electric power plant as just described. This grating assembly includes:
   a grating supported by a supporting structure and which, fulfilling a debris-stopping function, is adapted and intended to stop, on its upstream side, any debris carried by the water that is larger than the openings through the grating,
   association means for associating the grating with the supporting structure of the turbine unit and/or with the structure of the civil waterworks, having a structure permitting movement of at least the upper portion of the grating so that the latter is adapted and intended for placement in one of two positions:
      an upright position for the debris-stopping function, and
      a folded-down position for discharging, downstream of the grating and above its upper transverse edge, the floating debris stopped by the grating;
   grating movement and retention means which, in response to a control or to control means, are adapted and intended to move the grating between one and the other of its two positions and to retain it in one or the other of its two positions.

A third aspect of the invention relates to a method making use of a hydro-electric power plant as just described, for the purposes of discharging the floating debris stopped by the grating, wherein:
   initially the grating is in the upright position and the flap valve is in the upright closure position,
   the turbine unit is placed in operation, with water flowing through it,
   when necessary or when desired, particularly when the degree of clogging of the grating has reached a certain maximum degree or could have reached a certain maximum degree:
      the grating is told to move and the grating is accordingly moved from its upright position to its folded-down position,
      and the flap valve is told to move and the flap valve is accordingly moved from its upright closure position to its folded-down opening position, such that the upper transverse edge of the grating is level with the valve opening, the floating debris stopped by the grating thus being sent downstream of the flap valve and through the valve opening without passing through the impeller.

In one embodiment, with the grating placed in the folded-down position and the flap valve placed in the folded-down position, the blades of the impeller are placed in a position where they tend to close off the passage of the stream of water.

BRIEF DESCRIPTION OF THE DRAWING FIGURES

Figure 2:
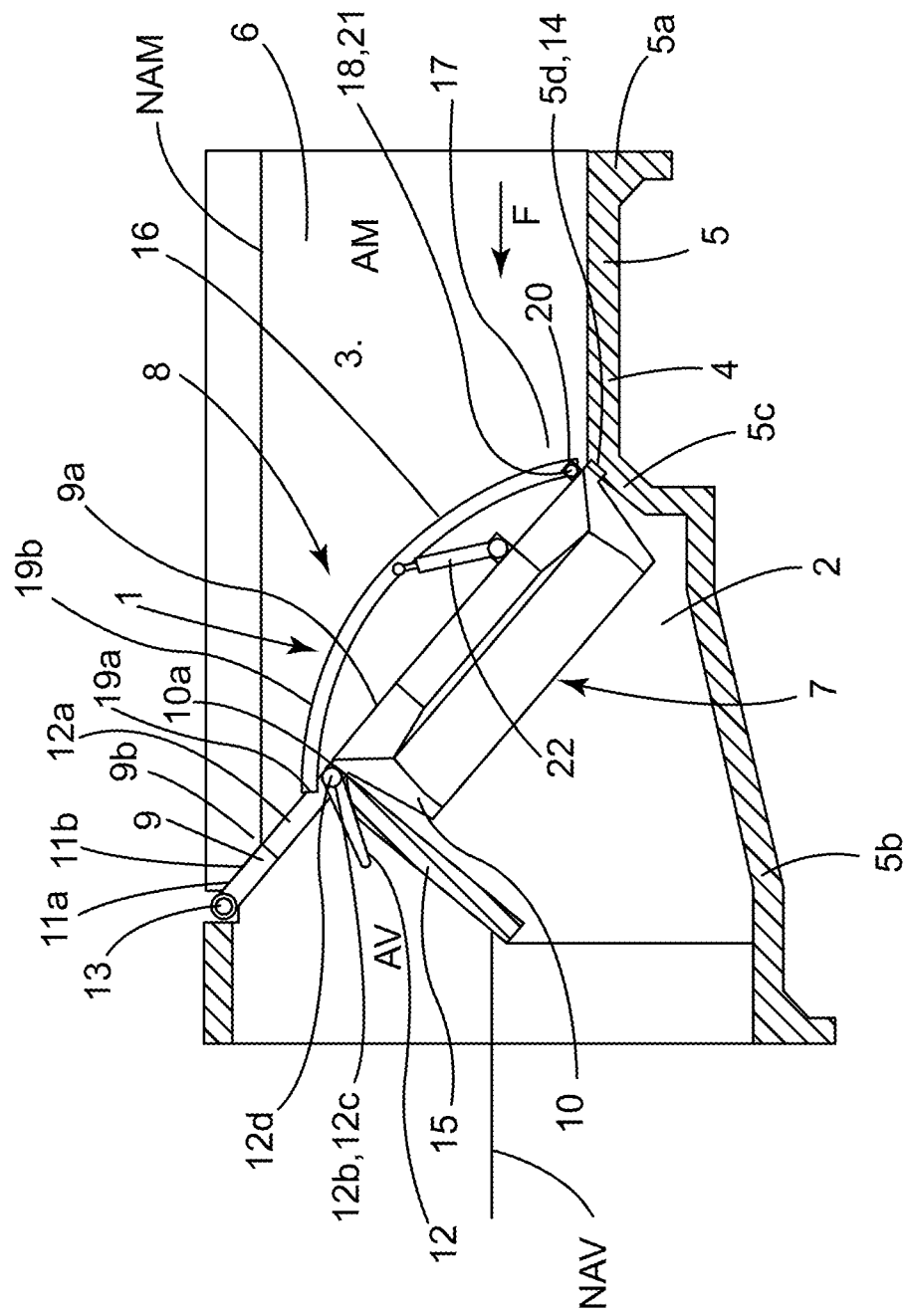
Figure 3:
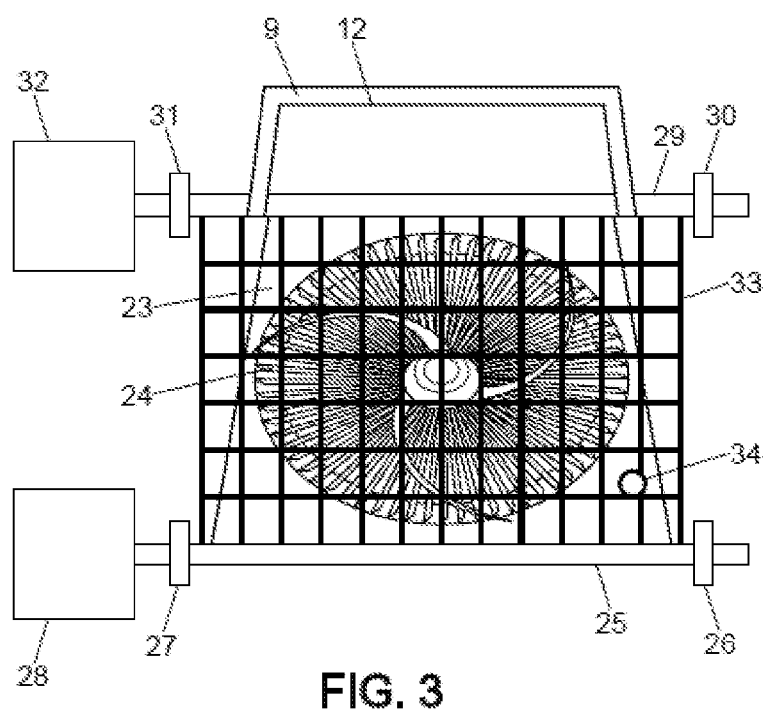
Figure 4:
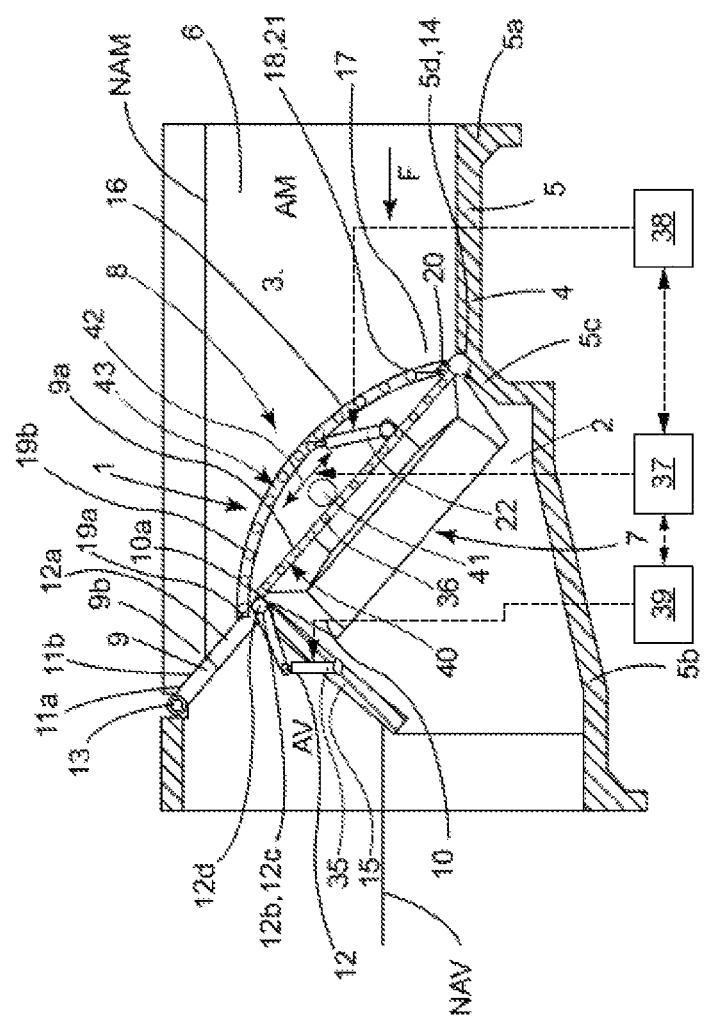

The invention is now described with reference to the accompanying drawings in which:

FIG. 1 is a schematic sectional view through a longitudinal vertical plane of a hydro-electric power plant installed in a civil waterworks, in the configuration where the impeller and the housing of the turbine unit are in the immersed downward position, the grating is in the upright position, and the flap valve is in the upright closure position, such that the hydro-electric power plant can generate electricity due to the stream of water passing through the turbine impeller, the debris being stopped on the upstream side of the grating of the grating assembly, FIG. 2 is a schematic view similar to FIG. 1, in the configuration where the impeller and the housing of the turbine unit are in the immersed downward position, the grating is in the folded-down position, and the flap valve is in the folded-down opening position, such that the upper transverse edge of the grating is level with the valve opening which serves to send, downstream of the flap valve and through the valve opening, the floating debris stopped by the grating, without the discharged debris passing through the impeller, FIG. 3 is a schematic front view of second embodiment of a hydro-electric power plant installed in a civil waterworks, in the configuration where the impeller and the housing of the turbine unit are in the immersed downward position, the grating is in the upright position, and the flap valve is in the upright closure position, such that the hydro-electric power plant can generate electricity due to the stream of water passing through the turbine impeller, the debris being stopped on the upstream side of the grating of the grating assembly, and FIG. 4 is a schematic sectional view through a longitudinal vertical plane of a third embodiment of a hydro-electric power plant installed in a civil waterworks, in the configuration where the impeller and the housing of the turbine unit are in the immersed downward position, the grating is in the folded-down position, and the flap valve is in the folded-down opening position, such that the upper transverse edge of the grating is level with the valve opening which serves to send, downstream of the flap valve and through the valve opening, the floating debris stopped by the grating, without the discharged debris passing through the impeller.

DETAILED DESCRIPTION OF THE INVENTION

We will now refer more specifically to FIGS. 1 and 2 which schematically represent a hydro-electric power plant 1 installed on and associated with a civil waterworks 2.

The civil waterworks 2 includes a channel 3 for a flow of water F and a structure 4 having a bottom slab or bottom 5 and two walls forming the side walls 6.

The following description is given in reference to the case where the hydro-electric power plant 1 is assembled on location at the civil waterworks 2. However, the invention also covers the case where the hydro-electric power plant 1, or assemblies or parts thereof, is not assembled on location at the civil waterworks 2.

Terms such as "upper", "lower", "top", "bottom", "above", "level with", "upright", "folded-down", "tilted", "inclined", "upstream", "downstream", "horizontal", and "vertical" are to be understood as being relative to the arrangement where the hydro-electric power plant 1 is assembled on location in the civil waterworks 2.

By convention, "longitudinal" is understood to mean extending in the direction of the channel 3, and "transverse" is understood to mean extending across the channel 3. It is understood that in general the words "longitudinal", "transverse", "horizontal", and "vertical" are not to be taken in a strict and narrow interpretation.

The channel 3 has, for example, a cross-section that is generally in the shape of a U or pseudo-U. The stream of water F flows upstream UP to downstream DOWN.

The bottom slab 5 is typically flat and generally horizontal or slightly inclined to the horizontal. In the embodiment shown, it comprises an upstream portion 5a and a downstream portion 5b which is lower than the upstream portion, with a downward-sloping section 5c connecting the upstream portion 5a to the downstream portion 5b.

The two walls forming the side walls 6 are typically vertical or substantially vertical and are parallel to each other.

The upstream UP nominal water level is denoted as NUP and the downstream DOWN nominal water level is denoted as NDOWN.

The flow of water F is for example the flow of a waterway or of a bypass channel. Typically, when the water reaches the upstream side it may contain debris such as plant debris (for example leaves, branches, plants), animal debris (dead animals), or debris of any other type (for example refuse, waste, packaging). The term "debris" is to be taken in its most generic sense. Such debris is more or less regular or irregular in size and more or less large in size.

The hydro-electric power plant 1 comprises, operatively associated with each other, a downstream turbine unit 7 and an upstream grating assembly 8 which allows the inflow of water. Both are adapted and intended for installation in and across the channel 3.

It is understood that the invention also covers the case where the hydro-electric power plant 1 comprises multiple turbine units 7 and/or multiple grating assemblies 8, arranged side by side in the channel 3.

Such a turbine unit 7 is of the general type described in document FR-A-2862723.

Such a turbine unit 7 includes a supporting structure and a turbine 9 with impeller mounted in a housing 10 having a flat cylindrical shape with an opening on the upstream side and an opening on the downstream side. The supporting structure 9 lies in a plane which is the main plane of the turbine unit 7, or which is parallel to the main plane of the turbine unit 7.

The turbine is, for example, a KAPLAN type turbine, and in any case the blades are mounted so that they can be more or less tilted about their radial axes, the impeller being more or less open or more or less closed.

The supporting structure 9 comprises a main portion 9a where the housing 10 is located and an upper portion 9b which extends the main portion 9a upwards. The main portion 9a is closed except for the area facing the openings of the housing 10. The upper portion 9b comprises two lateral arms 11a on either side of an opening 11b, not obstructing a flap valve 12.

In the embodiment represented, the side arms 11 are, at their upper end portions, mounted so as to pivot about an upper transverse axis 13. Thus, the impeller and the housing 10 are arranged so as to be adapted and intended for placement in either of two positions, an immersed downward position in the channel 3, for an electricity generation function (FIGS. 1 and 2), and a non-immersed raised position (not shown) for accessing the turbine unit 7 and/or freeing the channel 3 to allow the stream of water F to pass through.

The lower transverse edge 14 of the main portion 9a, and therefore of the turbine unit 7 and thus its supporting structure 9, is, in the immersed downward position, near or adjacent to the bottom slab 5. In particular, the lower transverse edge 14 rests on a transverse seating 5d arranged near the downward-sloping segment 5c.

The seating 5d and the axis 13 are offset longitudinally, the first toward the upstream side UP and the second toward the downstream side DOWN, such that the main plane of the turbine unit 7 in the immersed downward position is inclined from upstream to downstream and from the bottom toward the top at an angle of between 35° to 60°.

The turbine unit 7 is equipped on the upstream side and opposite the opening of the housing 10 with a water intake grating (not shown) allowing the inflow of water F, adapted and intended to stop, on its upstream side, any debris carried by the stream of water F of a size that is greater than the size of the openings through said grating. In such an embodiment, said grating assembly 8 can be described as a pre-grating assembly 8.

Further, in one possible embodiment, the turbine unit 7 is equipped on the upstream side with a scraper (not shown), in particular a rotating scraper, associated with the grating of the turbine unit 7.

In the embodiment shown, there is also a flap valve 12 which is part of a flap valve assembly having a valve opening 12a extending downward from opening 11b.

The flap valve 12 is positioned so as to be adjacent to and above the upper portion 10a of the edge of the housing 10. The flap valve 12 is adapted and intended for placement in and across the channel 3.

The flap valve 12 is adapted and intended to be arranged in either of two positions. In an upright closure position (FIG. 1), the plane of the flap valve 12 is in the main plane of the turbine unit 7 or in a neighboring plane. The flap valve 12 then closes the valve opening 12a. Thus, the flap valve 12 acts to stop the flow of water F on the upstream side UP and defines the nominal level on the upstream side NUP.

In a folded-down (FIG. 2) position, the flap valve 12 is horizontal or substantially horizontal and is folded toward the downstream side DOWN. It thus leaves the valve opening 12a unobstructed. This allows the water flow to pass from upstream to downstream through the valve opening 12a.

Also provided are means for associating the flap valve 12 with a structure, such as, in the embodiment shown, the supporting structure 9 of the turbine unit 7, the flap valve assembly 12, 12a and the turbine unit 7 then being associated structurally. The flap valve 12 association means have a structure allowing movement of the flap valve 12a such that it is adapted and intended for placement in one or the other of its two positions, upright closure and folded down opening.

The flap valve association means 12 have a structure, in particular of the type comprising a shaft mounted in a bearing, adapted to allow the flap valve 12 to pivot about a transverse axis 12b, in particular arranged toward the lower transverse edge 12c of the flap valve, toward the edge of the upper portion 10a of the housing 10, in particular over an angular path between the upright closure position and the folded down opening position of between about 50° to 90°.

Also provided are flap valve 12 movement and retention means which, in response to a control or to control means, are adapted and intended to move the flap valve 12 between one and the other of its two positions and to retain it in one or the other of its two positions. These flap valve 12 movement and retention means are selected, for example, from among an assortment comprising linear movement means such as a jack, or rotary displacement means such as a rotary engine, or manual means.

In the embodiment represented, there is also a deflecting and partitioning wall 15 which extends downstream of the turbine unit 7 and flap valve assembly 12, 12a. This deflecting and partitioning wall 15 is arranged between the edge of the upper portion 10a of the housing 10 and the lower transverse edge 12d of the valve opening 12a. In this manner, the streams of water respectively passing through the housing 10 and the valve opening 12a can be separated. In this particular example the deflecting and partitioning wall 15 is inclined from upstream to downstream and from the top toward the bottom.

The grating assembly (or pre-grating assembly, as previously indicated) 8 firstly includes a grating 16, which can be placed in and across the channel 3. Secondly, it includes a supporting structure 17 for the grating 15.

The grating 16 comprises solid portions which typically can be bars, especially bars regularly spaced apart, in general extending parallel to one another in a direction that can be raised. It also includes unobstructed openings. If the turbine unit 7 is equipped with a water intake grating as previously described, the openings through said grating are smaller in size than the openings through the grating 16 of the grating assembly 8.

Also provided are grating 16 association means 18 for associating the grating 16 with the supporting structure 9 of the turbine unit 7, in the embodiment represented in the figures. However, in other possible embodiments, the grating 16 association means 18 are associated alternatively or cumulatively to the structure 4 of the civil waterworks 2.

The grating 15 association means 18 have a structure allowing the movement of at least the upper portion of the grating 16 furthest from the bottom slab 5 so that it is adapted and intended to be arranged in one of two possible positions: an upright position (FIG. 1) and a folded-down position (FIG. 2).

In its upright position, the grating 16 is raised so that it intersects the channel 3 where the entire stream of water circulating in the channel passes through it, from the upstream side UP to the downstream side DOWN. In this position, the grating 16 acts to stop the debris, its upstream side stopping any debris carried by the water which is larger than the openings through the grating. For this operation, the flap valve 12, which is in the upright closure position, performs its sealing function. Thus, as the entire stream of water has previously passed through the grating assembly 8 and is cleared of the debris stopped by said grating assembly, it passes through the impeller of the turbine unit 7 without being able to pass through the valve opening 12a closed by the flap valve 12.

In its folded-down position, the grating 16 is at less of an angle relative to the horizontal and acts to discharge the floating debris stopped by the grating 16. This debris is discharged downstream from the grating 16 by passing over its upper transverse edge 19a, said upper transverse edge 19a being level with the valve opening 12a, which at this point is open because the flap valve 12 is in its folded-down opening position, while the upper portion 19b of the grating 16, adjacent to edge 19a, is located above and in particular at least slightly downstream from the edge of the upper portion 10a of the housing 10. Thus, the valve opening 12a acts to send, downstream of the flap valve 12 and through the valve opening 12a, the floating debris stopped by the grating 16, without the discharged debris passing through the impeller, given the presence and placement of the deflecting and partitioning wall 15.

It has been found that clearing and flushing the debris as just described is facilitated if the blades of the impeller are placed in a position where they more or less close off the passage of the stream of water, which is made possible by making use of an impeller with movable blades as has been described.

In the embodiment shown in the figures, the grating assembly 8 and the turbine unit 7 are arranged near one another, in particular adjacent to one another, and are structurally associated with each other to form a structural whole, the grating 16 association means 18 then being associated with the supporting structure 9 of the turbine unit 7, as indicated above.

In another embodiment, not shown, the grating assembly and the turbine unit are structurally separate from one another. The grating association means are then associated with the structure of the civil waterworks or with the supporting structure of the turbine unit.

The invention equally relates to the hydro-electric power plant 1 comprising the grating assembly 8 and the turbine unit 7 which are structurally associated to form a structural whole, and to the grating assembly 8 alone whether it is adapted and intended to be associated structurally with the turbine unit 7 or is intended to be structurally separate from the turbine unit 7 but operatively associated with it in the hydro-electric power plant when in place.

The following description focuses more specifically on the embodiment in which the grating assembly 8 and the turbine unit 7 are structurally associated with each other to form a structural whole. The embodiment in which the two assemblies 7 and 8 are separate is, however, within the scope of a person skilled in the art.

As indicated, the upright and folded-down positions concern at least the upper portion of the grating 16. In the embodiment represented in the figures, these positions concern the grating 16 itself which forms a solid whole, moved as a whole and placed as a whole in one or other of the two positions, upright or folded down. The following description focuses specifically on this embodiment. The embodiment in which only the upper portion of the grating 16 is placed in one or the other of two positions, upright or folded down, is however within the scope of a person skilled in the art.

In the embodiment where the grating 16 forms a solid whole, as represented in the figures, the grating 16 association means 18 have a structure allowing the grating 16 to pivot as a unit about a transverse axis 20, arranged near to or adjacent to the bottom slab 5. In one embodiment, the angular path of the grating 16 between the upright position and the folded-down position is about 35° to 55°.

In the embodiment shown in the figures, the grating 16 is pivotably associated with the turbine unit 7, and more specifically with its supporting structure 9, so as to pivot about the axis 20 near to or adjacent to the lower transverse edge 21 of the grating assembly 8, and therefore of the grating 16, and the lower transverse edge 14 of the turbine unit 7, and therefore of the supporting structure 9. In addition, the grating 16 association means 18 are associated with the supporting structure 9 of the turbine unit 7. In this embodiment, the lower transverse edge 21 of the grating assembly 8 and the lower transverse edge 14 of the turbine unit 7 are close to each other, in particular are adjacent. In this embodiment, the grating 16 is also moved with the housing 10 of the turbine unit 7, when the latter is arranged so to be moveable between the immersed descending position and the non-immersed raised position.

The grating 17 association means 18, which allow the grating to pivot between the upright and folded-down positions, have for example a structure of the type comprising a shaft mounted in a bearing.

The main plane of the turbine unit 7 and the plane defined by the upper and lower transverse edges 19a and 21 of the grating assembly 8 extend in one or more planes, in particular adjacent planes, inclined from upstream to downstream and from the bottom toward the top at an angle of between 35° to 60°.

The grating assembly comprises grating 16 movement and retention means 22 which respond to a control or to control means, and are adapted and intended to move the grating 16 and between one and the other of its two positions, upright and folded down, and to retain it in one or the other of its two positions. Such grating 16 movement and retention means 22 are, for example, selected from an assortment comprising linear displacement means such as a jack, or rotary displacement means such as a rotary engine, or manual means. Here, the movement and retention means 22 are placed between the supporting structure 9 of the turbine unit 7 and the grating 16.

In the embodiment represented in the figures, the grating 16 curves in a more or less constant curve, such that its convexity faces upstream and away from the turbine unit and its concavity 7 faces downstream and towards the turbine unit 7. In the upright position of the grating 16, the central plane of the grating 16 is vertical or nearly vertical. In general, in the upright position, the grating 16 protrudes above the nominal upstream level NUP, and for example even above the channel 3, as can be seen in FIG. 1.

The radius of curvature and the center of curvature of the grating 16 are such that, when the grating 16 is in the folded-down position, the upper portion 19b of the grating 16 is horizontal or slightly inclined to the horizontal, extending just above the edge of the upper portion 10a of the housing 10, the lower transverse edge 12d of the valve opening 12a, and the flap valve 12 which is therefore in the folded-down opening position. The upper transverse edge 19a of the grating 16 lies in the lower portion of the valve opening 12a.

In one embodiment, there are controller means for the grating 16 movement and retention means 22 and for the flap valve 12 movement and retention means 12 or for their controls or control means.

In one embodiment, it further provides means for detecting the degree of clogging on the grating 16, said means being associated with the controller means for the grating movement and retention means 22, the flap valve 12 movement and retention means, or their control means. Furthermore, the control means for the scraper movement means when such a scraper is provided are associated with the controller means for the grating 16 movement and retention means 22, or the flap valve 12 movement and retention means, or their control means.

The method for implementing the hydro-electric power plant 1 as described above is as follows.

Initially, the grating 16 is in the upright position and the flap valve 12 is in the upright closure position.

The turbine unit 7 is placed in operation, with water flowing through it. This can generate electricity.

When necessary or when desired, particularly when the degree of clogging on the grating 16 has reached a certain maximum degree or could have reached a maximum degree, the grating 16 is told to move and the grating 16 is accordingly moved from its upright position (FIG. 1) to bring it to its folded-down position (FIG. 2).

On the other hand, the flap valve 12 is told to move and the flap valve 12 is thus moved from its upright closure position to it to its folded-down opening position.

Thus, the upper transverse edge 19a of the grating 16 is level with the valve opening 12a and the floating debris previously stopped by the grating 16 is sent downstream of the flap valve 12 and through the valve opening 12a, without passing through the impeller which is therefore not damaged, thus not interfering with the operation of the turbine.

In one embodiment, when the grating 16 is placed in its folded-down position and the flap valve 12 is placed in its folded-down position, the blades of the impeller are placed in a position where they more or less close off the passage of the stream of water, which is made possible by choosing an impeller in which the blades can be angled to a greater or lesser extent which thereby closes or opens the turbine to a greater or lesser extent.

FIG. 3 is a schematic front view of a second embodiment of a hydro-electric power plant. On this figure one can see in particular:
- the impeller 23 with its blades 24;
- the grating 16 being mounted on a shaft 25 mounted in bearings 26, 27 allowing the grating 16 to pivot, when commanded by a rotary motor 28 forming rotary displacement means;
- the flap valve 12 being mounted on a shaft 29, mounted in bearings 30, 31 allowing the flap valve 12 to pivot, when commanded by a rotary motor 32 forming rotary displacement means; and
- the grating bars 33 of the grate 16, which can be provided with means 34 for detecting clogging.

FIG. 4 is a schematic sectional view through a longitudinal vertical plane of a third embodiment of a hydro-electric power plant installed in a civil waterworks, in the configuration where the impeller and the housing of the turbine unit are in the immersed downward position, the grating is in the folded-down position, and the flap valve is in the folded-down opening position, such that the upper transverse edge of the grating is level with the valve opening which serves to send, downstream of the flap valve and through the valve opening, the floating debris stopped by the grating, without the discharged debris passing through the impeller.

On this figure, one can see in particular that:
- the flap valve 12 can be moved with a jack 35 forming linear displacement means;
- the grating 16 can be moved with a jack 22 forming linear displacement means;
- the turbine unit 7 is equipped, on an upstream side and opposite the opening of the impeller housing, with a water intake grating 36 that is adapted to stop, on the upstream side, any debris carried by the water of a size greater than the openings 40 through said water intake grating 36, these openings being smaller in size than the openings 43 through the grating 16 of the grating assembly 8, said grating assembly 8 then constituting a pre-grating assembly, with regard to the water intake grating 36; and
- the turbine unit 7 is equipped on its upstream side with a scraper 41 associated with the water intake grating 36 of the turbine unit 7, and control means 37 for the scraper movement means 42 are associated with the controller means 38 for the grating movement and retention means 22, or the flap valve movement and retention means 35, or their control means 39.

The invention claimed is:

1. A hydro-electric power plant for a civil waterworks, the waterworks including a waterworks channel, traversed by a flow of water, and a waterworks structure with a bottom slab and side walls, the hydro-electric power plant comprising:
   a downstream turbine unit including:
      a turbine supporting structure in or parallel to a main plane of the turbine unit, the turbine supporting structure comprising
         a closed main portion in which is located a cylindrical housing with upstream and downstream openings, and
         an upper portion with an opening, and
      a turbine with an impeller with blades, mounted in the housing, the turbine unit being configured to be in an immersed downward position in which the turbine unit is tilted from lower upstream to upper downstream; and
   an upstream grating assembly configured to allow an inflow of water and configured to be installed in and across the channel, the downstream turbine unit and the upstream grating assembly being operatively associated, the upstream grating assembly including:
      a grating supported by a grating supporting structure and which, fulfilling a debris-stopping function, is configured to stop, on an upstream side, any debris carried by the flow of water that is larger than openings through the grating,
      a grating association system configured to associate the grating with the waterworks structure and/or with the grating supporting structure, configured to place the grating in and across the waterworks channel in an upright position in order to perform the debris-stopping function so that water free of debris travels through the impeller,
         the grating association system having a structure that allows the movement of at least an upper portion of the grating such that the upper portion of the grating is configured for placement in one or the other of the upright position and a folded-down position in which the upper portion of the grating is located above, and at least slightly downstream of, an upper portion of an edge of the housing, in order to discharge, in the downstream direction and above said upper portion of the edge of the housing, the floating debris stopped by the grating, without the debris passing through the impeller, and
      a grating movement and retention system which, in response to a controller, is configured to move the grating from one to the other of the upright position and the folded-down position and to retain the grating in one or the other of the upright position and the folded-down position.

2. The hydro-electric power plant according to claim 1, wherein the grating assembly and the turbine unit are structurally associated with each other to form a structural unit, the grating association system being associated with the supporting structure of the turbine unit.

3. The hydro-electric power plant according to claim 1, wherein a lower transverse edge of the grating assembly and a lower transverse edge of the turbine unit are adjacent to each other.

4. The hydro-electric power plant according to claim 1, wherein the grating association system has a structure comprising a shaft mounted in at least one bearing, allowing at least the upper portion of the grating to pivot about a rotation axis transverse to the flow of water.

5. The hydro-electric power plant according to claim 1, wherein the grating forms a solid unit, moved as a unit and placed as a unit in one of the upright position and the folded-down position, and
   the grating association system has a structure allowing the grating to pivot about a transverse axis adjacent to the bottom slab.

6. The hydro-electric power plant according to claim 5, wherein the grating is pivotably associated with the turbine unit so that the grating pivots about a transverse axis adjacent to a lower transverse edge of the grating assembly and a lower transverse edge of the turbine unit, and
  the grating association system is associated with the supporting structure of the turbine unit.

7. The hydro-electric power plant according to claim 6, wherein the impeller and the housing of the turbine unit are configured for placement in one of an immersed downward position for an electricity generation function, and a non-immersed raised position for access to the turbine unit and/or for clearing the water flow channel, the grating of the grating assembly being moved with the housing of the turbine unit.

8. The hydro-electric power plant according to claim 1, wherein the grating movement and retention system is selected from among an assortment comprising a linear displacement system, a jack, a rotary displacement system, a rotary engine, and a manual system.

9. The hydro-electric power plant according to claim 1, wherein the grating comprises bars extending parallel to one another in a direction in which the grating is raised from the folded-down position to the upright position.

10. The hydro-electric power plant according to claim 1, wherein the grating is curved with convexity facing upstream and away from the turbine unit and concavity facing downstream and towards the turbine unit, so that when in the folded-down position, the upper portion of the grating is configured to be horizontal or slightly inclined to the horizontal.

11. The hydro-electric power plant according to claim 1, further comprising:
  a flap valve of a flap valve assembly having a valve opening, which is located adjacent to and above the upper portion of the edge of the impeller and in the downstream direction with the upper transverse edge of the grating in the folded-down position, said upper transverse edge being level with the valve opening, configured for placement in and across the channel, and configured for placement in either of an upright closure position to stop the incoming flow of water, and a folded-down opening position to allow said flow of water to pass without passing through the impeller;
  a flap valve association system configured to associate the flap valve with the turbine supporting structure and/or with the grating supporting structure and/or with the waterworks structure, the flap valve association system having a structure which allows the movement of the flap valve and is configured to be arranged in one of the upright closure position and the folded-down opening position,
  a flap valve movement and retention system which, which, in response to a flap valve movement and retention controller is configured to move the flap valve between one and the other of the two positions and to be retained in one or the other of the two positions,
  the controller for the grating movement and retention system and a controller for the flap valve movement and retention system the grating movement and retention controller and the flap valve movement and retention controller controlling the grating movement and retention system and the flap valve movement and retention system such that
    when the grating is in the upright position, the flap valve performs a closure function in which the flap valve is in the upright closure position such that the flow of water having previously passed through the grating assembly and free of the debris stopped by said grating assembly passes through the impeller without being able to pass through the valve opening, and
    when the grating is in the folded-down position, the upper transverse edge of the grating is level with the valve opening, which acts to send, downstream of the flap valve and through the valve opening, the floating debris stopped by the grating, without the discharged debris passing through the impeller.

12. The hydro-electric power plant according to claim 11, wherein the flap valve assembly and the turbine unit are structurally associated with each other, the flap valve association system being associated with the supporting structure of the turbine unit.

13. The hydro-electric power plant according to claim 11, wherein the flap valve association system has a structure comprising a shaft mounted in a bearing, configured to allow the flap valve to pivot about an axis arranged transversely, or toward the lower transverse edge of the flap valve, toward the upper edge of the impeller housing, and near the upper transverse edge of the grating in the folded-down position, or following an angular path between the upright closure position and the folded-down opening position of about 50° to 90°.

14. The hydro-electric power plant according to claim 11, wherein the flap valve movement and retention system is selected from among an assortment comprising a linear displacement system, a jack, a rotary displacement system, a rotary engine, and a manual system.

15. The hydro-electric power plant according to claim 11, further comprising a detector configured to detect the degree of clogging of the grating, the detector being associated with the controller for the grating movement and retention system, the flap valve movement and retention system, or their control devices.

16. The hydro-electric power plant according to claim 11, wherein the main plane of the turbine unit, a plane defined by the flap valve in the upright closure position, and a plane defined by upper and lower transverse edges of the grating assembly, lie in one or more planes, or in adjacent planes, inclined from upstream to downstream and from the bottom toward the top at an angle of between 35° to 60°.

17. The hydro-electric power plant according to claim 11, further comprising a deflecting and partitioning wall extending downstream from the turbine unit and the flap valve assembly, arranged between the upper portion of the edge of the impeller housing and the lower transverse edge of the valve opening to separate the flows of water respectively passing through them, said deflecting and partitioning wall being inclined from upper upstream to lower downstream.

18. The hydro-electric power plant according to claim 11, wherein the turbine unit is equipped, on an upstream side and opposite the opening of the impeller, with a water intake grating that is configured to stop, on the upstream side, any debris carried by the water of a size greater than the openings through said grating, the openings being smaller in size than the openings through the grating of the grating assembly, said grating assembly then constituting a pre-grating assembly.

19. The hydro-electric power plant according to claim 18, wherein the turbine unit is equipped on the upstream side with a scraper associated with the water intake grating of the turbine unit, and
  a controller for a scraper movement system is associated with the controller for the grating movement and retention system, or the controller for the flap valve movement and retention system.

20. A method for utilizing a hydro-electric power plant according to claim 11, to discharge the floating debris stopped by the grating, the method comprising:
   initially providing the grating in the upright position and the flap valve in the upright closure position;
   placing the turbine unit in operation, with water flowing through the turbine unit; and
   when the degree of clogging of the grating has reached a certain maximum degree
      controlling the grating to move from the upright position to the folded-down position, and
      controlling the flap valve to move from the upright closure position to the folded-down opening position, such that the upper transverse edge of the grating is level with the valve opening, the floating debris stopped by the grating thus being sent downstream of the flap valve and through the valve opening without passing through the impeller.

21. The method according to claim 20, wherein, with the grating placed in the folded-down position and the flap valve placed in the folded-down position, the blades of the impeller are placed in a position in which the blades at least partially close off a passage for the flow of water through the turbine.

22. The hydro-electric power plant according to claim 1, wherein the grating assembly and the turbine unit are structurally dissociated from one another, the grating association system associated with the waterworks structure of the civil waterworks or with the supporting structure of the turbine unit.

* * * * *